Jan. 30, 1968 R. O'NEIL 3,366,548
BOILING WATER NUCLEAR REACTOR
Filed Jan. 21, 1966
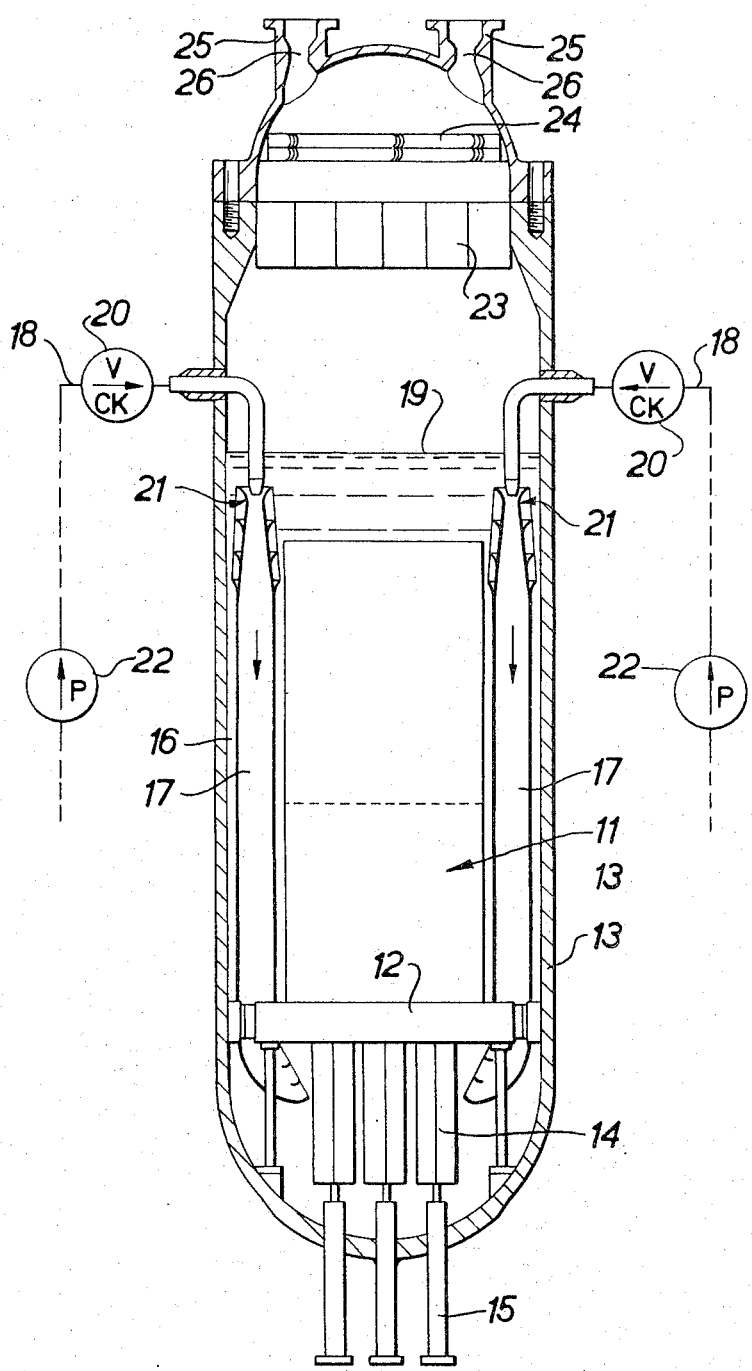

United States Patent Office 3,366,548
Patented Jan. 30, 1968

3,366,548
BOILING WATER NUCLEAR REACTOR
Robert O'Neil, Culcheth, England, assignor to United Kingdom Atomic Energy Authority, London, England
Filed Jan. 21, 1966, Ser. No. 522,150
Claims priority, application Great Britain, Jan. 26, 1965, 3,410/65
2 Claims. (Cl. 176—54)

ABSTRACT OF THE DISCLOSURE

A boiling water reactor pressure vessel houses a core which is submerged in water coolant. Pressurized feed water inlet pipes dip below the coolant level and energize jet pumps to recirculate the water coolant from the top to the bottom of the core. A plurality of steam/water outlet pipes have constrictions for establishing a mass flow rate of steam therethrough at sonic velocity in the range of two to three times the flow rate during normal operation, thus retarding depressurization within the vessel without interfering significantly with the outflow in normal operation.

---

The present invention relates to pressurised vapour generators of a kind in which liquid to be vaporised undergoes forced recirculation in a circuit having disposed therein a heater means. Generators of this kind are employed for raising steam to drive, for example, a steam turbine.

An object of the invention is to reduce the harm which can result from a burst of the piping in this kind of generator. This object is of greatest importance if the heater means operates by the fission of nuclear fuel. A well known example of vapour generator heated by nuclear fission is the boiling water reactor. To provide in the boiling liquid the order of temperature suitable for the generation of useful power the liquid has to be pressurised.

The chief consequence of a burst is depressurisation which can lead to the liquid phase fraction being flashed into the vapour phase at such rate that the heater means or reactor core becomes inadequately cooled. In the case of a reactor core containing sheathed fuel, overheating of the fuel as a result of inadequate cooling can cause the sheathing to fail so that fission products normally retained by this sheathing are released copiously and can escape into the atmosphere.

Such an escape is of course a grave hazard and it is for this reason that boiling water reactor power plant has hitherto been enclosed at least to a large extent, within a containment which is constructed with the aim of forming a continuous leak-proof membrane around all possible fission product escape paths. This aim inevitably entails some ability to withstand internal pressures, even in the case where provision is made for controlled venting of the container space.

The problem of arranging such a membrane over the plant is apt to be aggravated by operational and maintenance requirements. In particular, the need for penetration to give access to its interior may limit the standard of leak-tightness attainable. At all events containment vessels represent an extra cost and take up considerable space when often space is at a premium.

If a boiling water reactor is arranged for direct cycle operation, that is to say, the steam from the boiling water is supplied directly to a prime mover, such as a steam turbine, there is some reluctance to include the prime mover within the containment vessel because, firstly, debris resulting from its failure could damage the vessel at a time when integrity is most needed and, secondly, the greater radioactive contamination likely inside the vessel makes operation and maintenance more difficult. Placing the prime mover and its auxiliaries outside the vessel means that the integrity of both the vessel and the reactor are dependent upon one or more valves fitted in the steam and feed water lines at the location of the containment vessel walls. Safety will therefore rely on these valves being operable rapidly and the appropriate standard of reliability is not easily attainable.

Particularly in the case of a direct cycle boiling water reactor, there is a need for measures which would be more preventative than remedial in relation to depressurisation in the event of a pipe burst.

According to the present invention, a pressurised vapour generator of a kind in which liquid to be vaporised undergoes forced recirculation in a circuit having disposed therein a heater means comprising a vessel containing the heater means and also at least substantially all of the liquid recirculation circuit, a plurality of jet pumps each including a nozzle for forcing recirculation of the liquid in the circuit, several separate means penetrating the vessel from the exterior and each with its own external feed pump for feeding respectively to the jet pump nozzles a supply of liquid at a pressure sufficiently higher than that of the generated vapour to give collectively the requisite recirculation rate, and a vapour outlet penetrating the vessel from the exterior which outlet is constricted at or before the vessel penetration, the constriction being designed for the vapour to flow therethrough with sonic velocity at a mass flow rate which is greater than the rate during normal operation only to a limited extent, such as by a multiple of two, or at the most three.

A first feature of the invention as above set forth is that the recirculation circuit is at least largely, and preferably wholly, within the vessel; this feature eliminates the large diameter piping called for with a recirculation circuit which is wholly or largely external to the vessel and reduces immediately by a major factor the extent of bursting liability.

Apart from the vapour outlet, the only other pipework of major significance for accidental depressurisation is therefore the feed pipes by which the requisite liquid make-up supply is introduced into the recirculation circuit. Several of these are provided, each with its individual feed pump, so that the pipe size can be small; the small size reduces bursting liability and is also restrictive to depressurising back flow in the event that a burst does occur. The feature that these pipes operate jet pumps in the recirculation circuit achieves two main advantages; firstly, the nozzle, which is then necessary at the end of the pipe, is a further restriction on back flow and secondly a jet pump avoids the difficulties which can arise with the use of a mechanical pump for the same duty. The latter requires extra vessel penetrations, is often awkward to position without conflict with competing claims on space, and is not easily accessible for maintenance.

It is preferred to follow the practice of including a non-return valve in each of the feed pipes near the downstream end. Such a valve should act to prevent substantial back flow and therefore might be thought to be the complete answer to the safety problem on the inlet side. On the contrary, however, it is considered imprudent to rely merely on a non-return valve when the safety of so much is at stake.

A further precautionary expedient in accordance with the invention is the disposition of the jet pump nozzles in such manner that they open beneath, but adjacent to, a level at which the liquid forms a free surface during normal operation of the generator. This proximity to the surface means that, if a depletion of liquid in the vessel commences due to back flow, the nozzle will quickly become exposed to the lower density vapour phase and the rate of escape in terms of mass will be very much reduced. Thus with this expedient, it is easy to design for a sufficient number of feed pipes to fulfil the requirement that the liquid level in the vessel will not fall substantially beyond the nozzle openings if back flow occurs in one of the pipes due to a burst.

An alternative way of meeting this requirement is to have a large number of feed pipes, so many in fact that even if back flow escape from one such pipe is entirely in the liquid phase the remainder can make good the loss and keep the level in the vessel substantially unchanged. It is not necessary in this case that every feed pipe is associated with a recirculation jet pump and therefore the invention includes within its scope the possibility of the jet pumps having multiple feed pipes; however, the requirement for individual feed pumps for each feed pipe would still stand and because this is apt to reduce plant efficiency and increase capital cost the alternative in question may be less attractive.

The invention will be further described with reference to the accompanying diagrammatic drawing in which is shown a particular embodiment in a boiling water reactor.

As illustrated, a core 11 composed of fuel assemblies upstanding on a support structure 12 is contained within an upright dome-ended cylindrical vessel 13. Control rod blades 14 are insertable into the core from below by means of drive mechanisms 15 penetrating the lower end of the vessel 13. There is an annular space 16 between the core and the vessel walls and this space contains a ring of open-ended tubes, such as 17. The open bottom ends of these tubes communicate through the support structure 12 with the lower inlet end of the core and the tubes therefore constitute the circuit for recirculation of water from the upper outlet end of the core back to the inlet end; as will be apparent, the water recirculation circuit is therefore wholly within the vessel 13.

The make-up supply of feed water is distributed equally among several pipes, such as 18, equal in number to the tubes 17 and each penetrating the vessel separately in a region above the normal water level 19 therein; at the vessel penetration each pipe includes a non-return valve 20 arranged to obstruct back flow out of the vessel. The feed pipes 18 terminate internally of the vessel in downwardly directed nozzles which co-operate with throat sections formed in the upper open ends of the tubes 17 to form jet pumps indicated generally 21. Each feed pipe has its own respective feed pump 22 which supplies the feed water to the jet pump nozzles at a pressure sufficiently higher than the pressure at the core outlet to produce the requisite rate of recirculation back to the core inlet.

At the upper end of the vessel 13 an outlet for steam, which is separated from the water/steam mixture at the core outlet by the separators and driers indicated respectively at 23 and 24, is made up of a plurality of pipes, say four, of which two are shown as indicated at 25. Each such pipe penetrates the vessel from the exterior and has an individual constriction opening into the vessel as indicated diagrammatically at 26.

The constriction in the steam outlets retards depressurisation within the vessel without interfering significantly with the outflow in normal operation. Assuming that shut down is effected immediately a burst occurs on the steam outlet side, it becomes possible by virtue of this retardation for the feed pipes to introduce enough water to keep the core covered as the heat output falls. It is even possible, and in fact preferred, that this coverage of the core with water is sustainable with a lesser number of feed pipes than are actually provided so that standby power supply facilities for guaranteeing power to the pumps do not have to be installed for the full number. The limitation of such facilities is an economy. There would have to be available, however, a switch-gear enabling these limited facilities to be connected selectively to different pump groups.

Flow through the outflow constrictions in normal operation can be approximately adiabatic and the slight pressure drop which is inevitable at the constriction in normal operation may be advantageous in eliminating residual wetness in the vapour.

The plurality of outlet pipes 25 appearing in the drawing should be adapted, as by valves, for isolation one from another at their downstream ends if ultimately they merge into a common line. Assuming that a burst affects only one of these pipes and that isolation is effected, the outgoing mass flow rate from the vessel is not increased to the same extent as would be the case with a single outlet pipe. For example, with an outlet of four pipes each with a constriction designed to be critical at double the normal mass flow rate, the overall outgoing rate is only increased by a factor of 1.25 in respect of the assumptions just mentioned.

An alternative way in which the constriction may be introduced is by providing on the outlet, or on each of the pipes constituting the outlet, an extension projecting inwardly into the vessel, the constriction being installed in the inward extension. This arrangement is a protection against escape paths circumventing the constriction.

A boiling water reactor incorporating protective measures in accordance with the invention can be considered so safe as to enable a relaxation of containment requirements to be acceptable, providing of course that the probability of catastrophic failure of the reactor pressure vessel, be it of concrete or of steel, can be made acceptably remote by suitable design and inspection in service.

What I claim is:
1. A boiling water nuclear reactor comprising:
a pressure vessel;
a core contained in the vessel;
water coolant submerging the core up to a normal coolant level;
feed water inlet means comprising a plurality of inlet pipes penetrating the vessel and having their outlet ends below said normal coolant level;
steam/water outlet means comprising a plurality of outlet pipes;
constriction means in each of said outlet pipes for establishing a mass flow rate of steam therethrough at sonic velocity of not more than three times the flow rate during normal operation;
and jet pumps energized by external feed water pumps in said inlet pipes to recirculate water coolant from the top to the bottom of said core.

2. A boiling water nuclear reactor as claimed in claim 1 wherein said constriction means comprises means for establishing a mass flow rate at sonic velocity in the range of between two and three times the flow rate during normal operation.

References Cited
UNITED STATES PATENTS

| | | | |
|---|---|---|---|
| 2,861,033 | 11/1958 | Treshow | 176—56 |
| 3,087,881 | 4/1963 | Treshow | 176—54 |
| 3,202,584 | 8/1965 | Bogaardt et al. | 176—61 |
| 3,274,065 | 9/1966 | Kierulf et al. | 176—56 |
| 3,284,312 | 11/1966 | West | 176—56 |

FOREIGN PATENTS

| | | |
|---|---|---|
| 796,966 | 6/1958 | Great Britain. |

L. DEWAYNE RUTLEDGE, *Primary Examiner.*